United States Patent
Miyamoto et al.

(10) Patent No.: US 6,176,780 B1
(45) Date of Patent: Jan. 23, 2001

(54) TWO-PLAYER VIDEO GAME WITH METHOD OF DISPLAYING LOGOS AND INSTRUCTIONS IN A MANNER READABLE BY BOTH PLAYERS

(75) Inventors: Kojiro Miyamoto; Masaki Namikoshi, both of Tokyo (JP)

(73) Assignee: Sega Enterprises, Ltd., Tokyo (JP)

( * ) Notice: Under 35 U.S.C. 154(b), the term of this patent shall be extended for 0 days.

(21) Appl. No.: 09/024,107

(22) Filed: Feb. 17, 1998

(30) Foreign Application Priority Data

Feb. 17, 1997 (JP) .................................................. 9-032418

(51) Int. Cl.⁷ ........................................................ A63F 9/24
(52) U.S. Cl. .............................. 463/4; 463/3; 273/108.52
(58) Field of Search ............................... 463/4, 2, 30–33, 463/36–38, 3; 345/126, 955, 962, 958, 959, 960, 473; 273/317.1, 317.5, 108.1, 108.52

(56) References Cited

U.S. PATENT DOCUMENTS

| | | | |
|---|---|---|---|
| Re. 28,507 | * 8/1975 | Rusch | 463/3 |
| D. 314,985 | * 2/1991 | Monneret | D21/318 |
| 3,874,669 | * 4/1975 | Ariano et al. | 463/4 |
| 3,921,161 | * 11/1975 | Baer | 463/31 |
| 4,034,983 | * 7/1977 | Dash et al. | 436/3 |
| 4,086,578 | * 4/1978 | Masili | 345/121 |
| 4,093,223 | * 6/1978 | Wilke et al. | 436/4 |
| 4,386,776 | * 6/1983 | Bromley | 463/4 |
| 4,570,158 | * 2/1986 | Bleich et al. | 345/24 |
| 4,691,920 | * 9/1987 | Murphy et al. | 463/3 |
| 4,710,873 | * 12/1987 | Breslow et al. | 463/31 |
| 4,713,007 | * 12/1987 | Alban | 463/37 |
| 4,797,836 | * 1/1989 | Wetek et al. | 345/473 |
| 4,860,217 | * 8/1989 | Sasaki et al. | 345/425 |
| 4,952,051 | * 8/1990 | Lovell et al. | 352/87 |
| 5,563,625 | * 10/1996 | Scott | 345/126 |
| 5,577,175 | * 11/1996 | Naka et al. | 345/427 |
| 5,850,229 | * 12/1998 | Edelsbrunner et al. | 345/473 |
| 5,926,154 | * 7/1999 | Hirono et al. | 345/5 |

OTHER PUBLICATIONS

Foley et al., Computer Graphics:Principles and Practice, 2nd Ed, 1990, Addison–Wesley, p. 614.*

* cited by examiner

Primary Examiner—Joe H. Cheng
Assistant Examiner—Kim T. Nguyen
(74) Attorney, Agent, or Firm—Dickstein Shapiro Morin & Oshinsky LLP

(57) ABSTRACT

In video game device 1, two game players opposed to each other across a monitor screen 3 compete a game. Game images are displayed on the monitor screen 3, properly positioned with respect to the respective game players. A logo is displayed in a game image. The logo is rotated to be displayed properly with respect to the respective game players and horizontally properly positioned. Thus game images can be recognized by the respective game players opposed to each other, and the logo display can be more effective.

11 Claims, 16 Drawing Sheets

TWO-PLAYER VIDEO GAME WITH METHOD OF DISPLAYING LOGOS AND INSTRUCTIONS IN A MANNER READABLE BY BOTH PLAYERS

BACKGROUND OF THE INVENTION

The present invention relates to a video game device for playing a game by means of images displayed on a monitor screen, such as a CRT or others, more specifically to a method for displaying various images on the monitor screen and a method for controlling a game.

Video game devices for competing games, such as competing shooting games and competing block collapsing games, which are played by a plurality of game players by the use of one monitor screen are known. A video game device for competing a game, such as a competing block collapsing game, which is played by game players sitting on both sides of one monitor screen usually includes a coin slot provided in one of said both sides, and a selection button provided near the coin slot for selecting one-game-player-play or two-game-player-play. The video game device for playing such competing games includes controllers for operating characters on the monitor screen. The controllers are provided respectively on both sides of the monitor screen.

In a general video game device, in a state in which the device is waiting for a game player to insert coins, often a logo of a game maker, high scores, or others are displayed on the monitor screen in addition to inducing a game player to insert coins. On the following game initial stage images which explain an operational method of controllers are outputted at the start of a game. It is general that such game initial display is formed on the preface that the display is seen on a side of the game device having a coin slot.

However, in the above-described competing video game device, such one-sided arrangement makes letters or logos opposite to a game player facing a game player on the side of the coin slot, which makes the former player feel awkward. In a case that the displayed images are connected with contents of a game play, such as a method for operating controllers, in such one-sided arrangement the game player facing the game player on the side of the coin slot moves to the side of the coin slot to understand the display, which disadvantageously takes time to start the game play.

As competing mechanical devices for competing games are conventionally known those for playing soccer games, hockey games or others, in which a plurality of operational sticks are operated by game players to treat balls, and the game players compete in score. The players have to well operate the plural operational sticks. Such games thus have an athletic factor and are established as popular games in game centers.

If such competing mechanical devices are provided in video game devices, screen displays, game control, etc. which are impossible on the competing mechanical devices are made possible, and such video game devices will become popular.

SUMMARY OF THE INVENTION

An object of the present invention is to provide a display method of a competing video game device for providing game images which can be easily recognized on either either side of a competing video game device.

Another object of the present invention is to provide a control method of a competing mechanical game device in a form of a video game device.

The above-described objects are achieved by a display method of a video game device in which two game players are opposed across a monitor screen to compete, a game image being displayed on the monitor screen, properly positioned with respect to both game players. Game images can be easily recognized by the game players on both sides opposed to each other.

In the above-described display method of a video game device it is possible that the game image includes a game stand-by image displayed when the video game device stands by for a start of a game.

In the above-described display method of a video game device it is possible that the game image includes operation explanatory displays on the monitor screen which is divided so that the operation explanatory displays are properly positioned with respect to the respective game players. An operation explanatory message can be provided positioned properly with respect to the respective game players, which allows the game players to start a game after they insert coins.

In the above-described display method of a video game device it is possible that the game image includes a specific display; the specific display is displayed alternately by a first display mode in which the specific display is properly positioned to one side of the monitor screen and a second display mode in which the specific display is properly positioned to the other side of the monitor screen through a third display mode in which the specific display cannot be recognized on either side of the monitor screen; when the first display mode is shifted to the third display mode and when the third display mode being shifted to the first display, the first display mode is modified to be shifted; and when the second display mode is shifted to the third display mode and when the third display mode is shifted to the second display mode, the second display mode is modified to be shifted. This makes game displays effective.

In the above-described display method it is possible that when the first display mode is shifted to the third display mode and when the third display mode is shifted to the first display mode, the first display mode is modified so that the specific display is rotated on a rotation axis parallel with the monitor screen; and when the second display mode is shifted to the third display mode and when the third display mode is shifted to the first display mode, the second display mode is modified so that the specific display is rotated on a rotation axis parallel with the monitor screen. A display can be provided on the monitor screen in a first display mode and a second display mode without making the game players feel awkward.

The above-described objects are achieved by a control method of a video game device in which two game players are opposed across a monitor screen to compete, the video game device comprising: a game device body including the monitor screen; a plurality of operational sticks projected from the game device body toward the respective game players and being forwardly and backwardly slidable and/or rotatable clockwise and anti-clockwise; the respective game players operating characters displayed on the monitor screen by said a plurality of operational sticks to hit a ball displayed on the monitor screen. A plurality of operational sticks are controllers of the game device, whereby a game can be played on the game device in the feeling of playing a game on a mechanical competing game device in which characters are operated by rods, which makes the game easy to understand.

In the above-described control method of a video game device it is preferable that a moving speed of the hit ball is based on a sliding speed of the operational sticks upon hitting. A speed of the hit ball can be easily adjusted, which makes the game players feel good in operations.

In the above-described control method of a video game device it is preferable that when a rotation speed of the operational sticks is above a prescribed value, in a case that the ball is in a region where the ball can be hit, the hit ball floats above a field; and in a case that the ball is outside the region where the ball can be hit, the character take a sliding action in a rotation direction. This allows game operation to have varieties, and the game can entertainingly have varieties.

In the above-described control method of a video game device it is possible that when the ball hit the character from front, a reflection angle of the ball is equal to an indent angle of the ball on the characters.

In the above-described control method of a video game device it is possible that when the ball hits the character from behind, the ball is refracted on the character to pass through the characters.

In the above-described control method of a video game device it is possible that when the characters are moving forward and backward, a reflection angle or a refraction angle of the ball changes based on a forward or backward moving speeds of the characters. This enables traces of the ball to be anticipated to some extent, and a trace of the ball can be freely changed by operating the sticks. Accordingly the game can be more entertaining.

In the control method of a video game device it is preferable that a moving speed of the ball is gradually decreased corresponding to moving distances after it is hit. The ball is moved in an almost actual manner, which makes the game realistic.

In the control method of a video game device it is preferable that a minimum speed of the ball does not become zero. This prevents the ball from stopping in a region where characters can be moved and interrupting the game.

In the control method of a video game device it is preferable that cheering voices being changed corresponding to positions of the ball so as to be louder as positions of the ball become nearer to a goal post. This makes the game more realistic.

DETAILED DESCRIPTION OF THE INVENTION

A soccer game device according to one embodiment of the present invention will be explained with reference to the drawings attached hereto.

Figure 1:
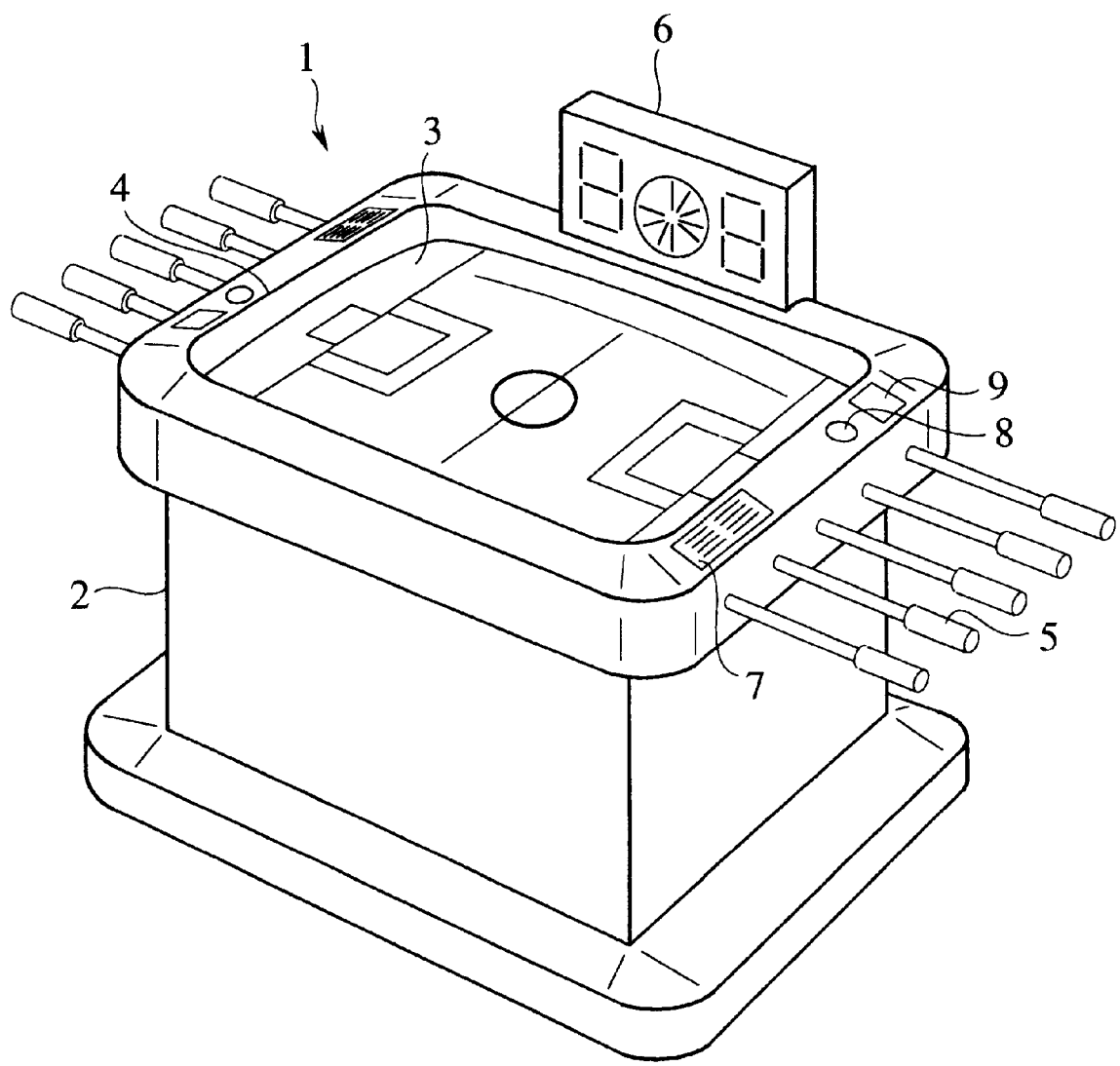
FIG. 1 is an appearance view of the soccer game device according to one embodiment of the present embodiment of the present invention.

FIG. 1 is an appearance view of the soccer game device according to the present embodiment. In FIG. 1 a monitor screen 3, such as a CRT or others, for displaying a soccer stadium is incorporated in a game device body 2 of the soccer game device 1 with the display surface faced upward. An operational board 4 is disposed on the upper surface of the game device body 2, surrounding the monitor screen 3. Two sets of five sticks 5 to be operated by game players are projected from sides of the operational board 4 opposed to each other. The game players can play the game, facing each other across the monitor screen 3.

A counter unit 6 for displaying scores of the game and a transient time is disposed on the operational board 4 at one side of the center line of the soccer field. Near each set of the operational sticks 5 there are disposed a seal or plate 7 explaining the method for playing the game, various operational buttons, and a coin slot 9.

Figure 2:
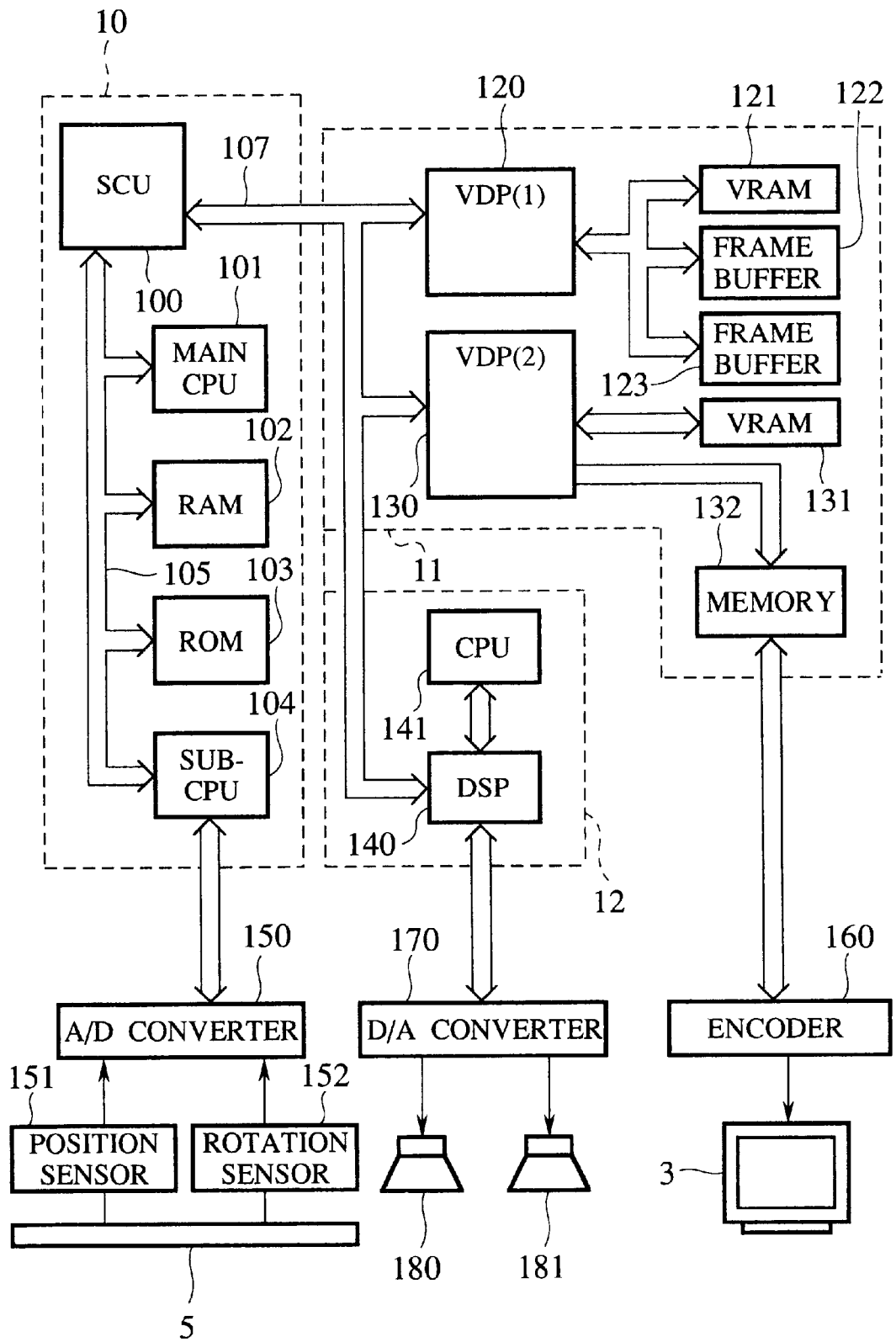
FIG. 2 is a block diagram of the soccer game device according to the embodiment of the present invention.

FIG. 2 is a block diagram of the soccer game device 1 according to the present embodiment, which shows an operation control thereof.

The soccer game device mainly comprises a CPU block 10 which manages general operation control of the device and constitutes a part of display control means, a video block 11 for performing display control of game displays, and a sound block 12 for producing effective sounds, etc.

The CPU block 10 includes an SCU (System Control Unit) 100, a main CPU 101, a RAM 102, a ROM 103, a sub-CPU 104, a CPU bus 105, etc. This block conducts the operation of the soccer game device 1.

The main CPU 101 incorporates a DSP (Digital Signal Processor) and can execute computer programs at high speed. The RAM 102 stores various image data, etc. transferred from the ROM 103 and also is a work area of the main CPU 101.

The ROM 103 stores a program for initialization in the initial state of the soccer game device 1 and a program for performing game control of the soccer game. SCU 100 generally administers transfer of data through buses 105, 106, 107. The SCU 100 incorporates a DMA controller and transfer required image data to a VRAM of the video block 11 in execution of the game.

A position sensor 151 and a rotation angle sensor 152 are provided corresponding to each stick 5 and are connected to the sub-CPU 104 through an A/D converter 150 for converting analog signals from these sensors to digital signals. The sub-CPU 104 is called an SMPC (System Manager & Peripheral Controller) and functions to collect player data indicative of positions and motions of the game characters (the field players and the goal keepers). Specifically, the sub-CPU 104 computes displacement speeds (slide speeds and rotation speeds (rotation amounts per a unit time) of the sticks 5, based on stick positions and rotation angles provided by the position sensors 251 and rotation angle sensors 152 connected to the sticks 5.

The main CPU 101 processes movement of images to be displayed on the monitor screen 3, based on displacement data of the sticks 5 transferred from the sub-CPU 104.

The video block 11 operates as a part of the display control means and includes a VDP (Video Display Processor ) 120 for producing game images and a VDP 130 for image synthesis for background images (the soccer field), shading processing which will be described later and clipping. The VDP 120 is connected to a VRAM 121 and a frame buffer 123, and the VDP 130 is connected to a VRAM 131 and a memory 132.

When an image of the soccer field to be displayed on the monitor screen 3 is produced, image data necessary for the display is transferred from the main CPU 101 to the VDP 120 via the SCP 100 to be written in the VRAM 121. The image data written in the VRAM 121 is transferred to a drawing frame buffer 122 or 123 as drawing data containing 16-bit or 8-bit color information per one picture element. The main CPU 101 supplies control information for controlling drawing to the VDP 130 via the SCU 100. Based on the control information, the VDP 130 processes the drawing data.

The VDP 130 is connected to the VRAM 131, and has a scroll function of moving the entire display screen up and down and left and right, and a priority function (the z-sort or z-buffer) of determining a display order of image data. The VDP 130 outputs the drawing data to an encoder 160 via the memory 132. The drawing data outputted to the encoder 160 is converted to a format of a video signal and then D/A converted, and is displayed on the monitor screen 3. Thus, based on the video signal, an image is displayed on the monitor display 3.

The sound block 12 performs sound synthesis by PCM or FM, and includes a DSP 140 and a CPU 141 for controlling the DSP 140. Sound data produced by the DSP 140 are converted to a 2-channel signal by a D/A converter 170 and is outputted to two speakers 180, 181.

Then, production processing for respective images of the video game device 1 according to the present embodiment will be explained.

Figure 3:
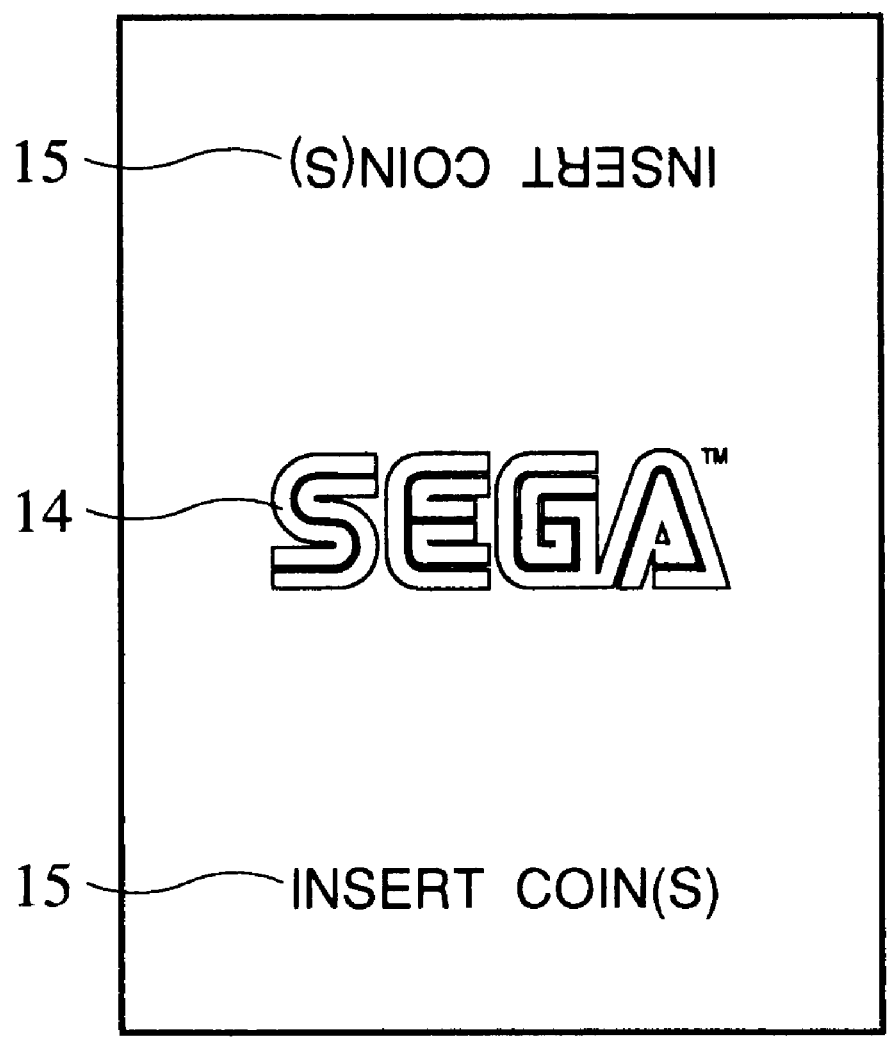
FIG. 3 is a view an initial display on a monitor screen of the soccer game device according to the embodiment of the present invention.

FIG. 3 exemplifies a stand-by image for a state of the video game device 1 before the game is started, e.g., a state in which, in, e.g., a game center or others, the video game device 1 is waiting for game players. A logo 14, such as a company name or others, is arranged at the center of the image, and a message 15 "INSERT COIN(S)", etc. is displayed on and off.

In a case that, as in a soccer game, two game players play, facing each other across one monitor display 3, it is preferable that the logo 14 at the center is displayed in the proper direction.

Figure 4:
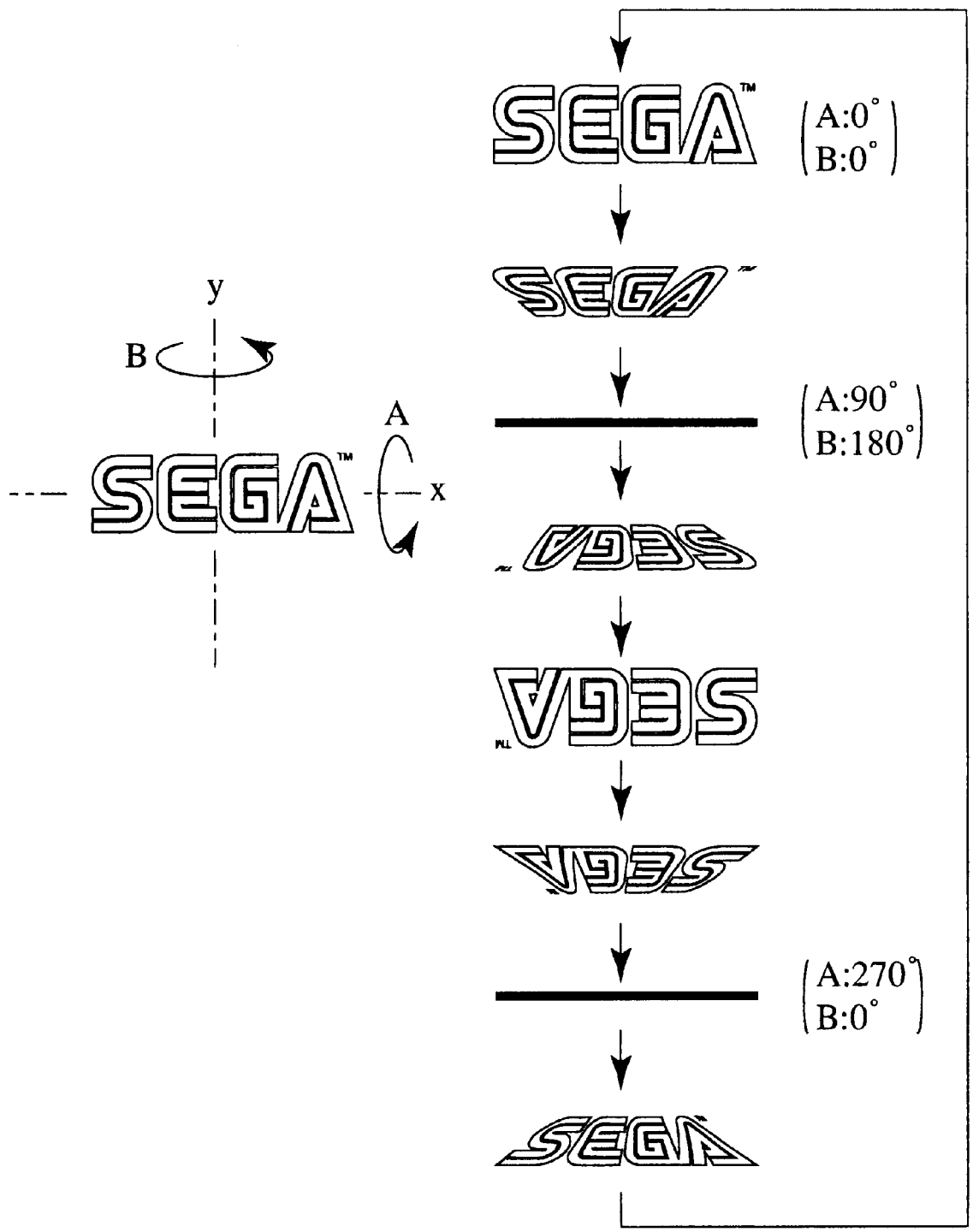
FIG. 4 is explanatory views of transient changes of a logo display on the initial display of FIG. 3.

From this viewpoint, FIG. 4 shows transient changes of the logo displayed on the monitor screen 3 of the soccer game device 1.

As shown in FIG. 4, in the present embodiment the logo 14 in the form of a company name (e.g., SEGA) as pixel data is transiently rotated on the x-axis and the y-axis for higher effective representation.

The logo 14 is set so as to properly position with respect to one game player when a rotation angle A on the x-axis is 0°. The logo 14 which rotates on the monitor screen is set so that when its rotation angle on the x-axis reaches 180°, simultaneously therewith the logo 14 rotates by 180° (a rotation angle B=180°) on the y-axis. Then, the logo 14 further rotates on the x-axis, and even when the logo 14 properly positions with respect to the other game player, the logo 14 is not the mirror letters and is properly displayed in the horizontal direction. The logo 14 further rotates on the x-axis, and when a rotation angle A is 180°, the logo 14 is largest. The logo 14 further rotates on the x-axis, and when a rotation angle A reaches 270°, the logo 14 rotates by 180° on the y-axis (a rotation angle B=0°). Then the logo 14 rotates on the x-axis to properly position with respect to said one game player. This display control is repeated, whereby a display in which as the logo 14 rotates, the logo 14 positions alternately properly with respect to both game players and always properly in the horizontal direction can be realized.

Figure 5:
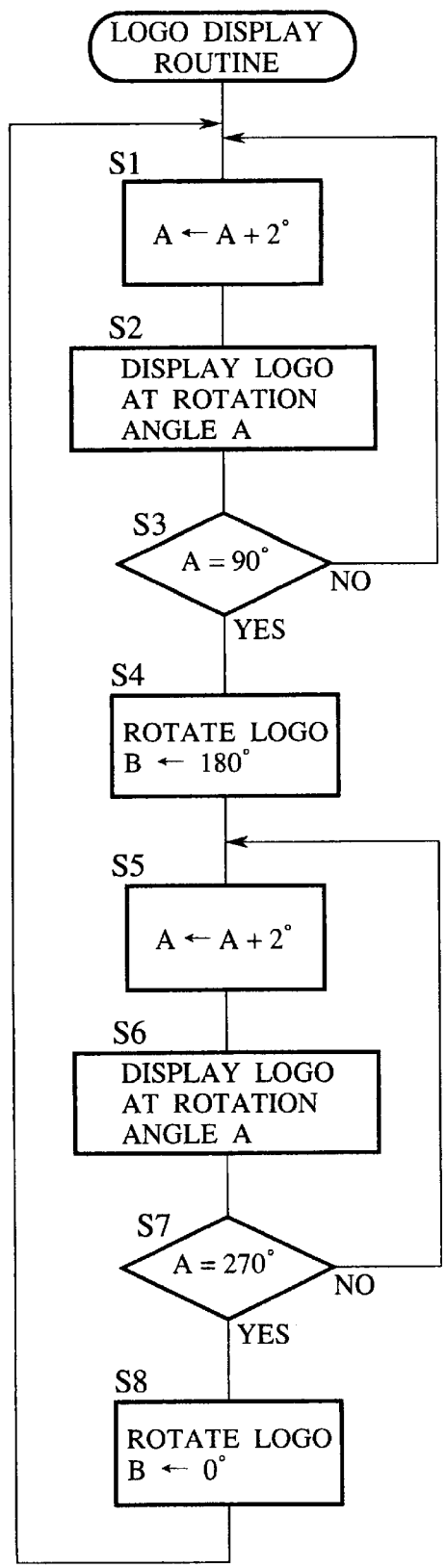
FIG. 5 is a flow chart of a logo display method of displaying the logo on the initial display of FIG. 3.

FIG. 5 is a flow chart of the above-described display routine of the logo. A program for executing this display routine is stored in a prescribed region in the ROM 103.

The logo display routine is executed when the CPU block 10 detects an operational state, and the operational state is that the video game device 1 is not being operated for a game play by game players.

When the logo display routine is started, a logo rotation angle A is advanced by an angle corresponding two rotations in a prescribed unit time. (Step S1). The logo 14 corresponding to a logo rotation angle A at this time is displayed (Step S2). The above-described rotation angles A, B are initialized to be 0° at the time of, e.g., turning on the video game device 1.

Then, it is judged whether or not a current rotation angle A has reached 90° corresponding to the straight line displayed upper in FIG. 4 (display which cannot be recognized on either side of the monitor screen) (Step S3). When it is judged in Step S3 that the current logo rotation angle A has not reached 90°, Step S1 follows, and the processing of Step S1 and Step S2 is repeated.

When it is judged in Step S3 that the current logo rotation angle A has reached 90°, computation for rotating the current logo 14 by 180° on the y-axis is immediately performed to position the logo 14 properly with respect to one game player (located upper in FIG. 3) (Step S4).

When the logo is thus rotated, then Step S5 follows. The logo rotation angle A is advanced by an angle corresponding to two rotations in a prescribed unit time (Step S5), and logo display processing corresponding to a rotation angle A at this time is performed (Step S6).

Then, it is judged whether or not the current logo rotation angle A has reached 270° corresponding to the straight line displayed lower in FIG. 4 (display which cannot be recognized on either side of the monitor screen) (Step S7). When it is judged in Step S7 that the current logo rotation angle A has not reached 270°, Step S5 follows, and the processing of Step S5 and Step S6 is repeated.

When it is judged in Step S7 that the current logo rotation angle A has reached 270°, computation for rotating the current logo 14 by 180° on the y-axis, i.e., returning a rotation angle B on the y-axis to 0° to position the logo 14 properly with respect to the other game player (located lower in FIG. 3) (Step S8).

When the logo is thus rotated, Step S1 follows, and the above-described processing is repeated.

As described above, in the video game device 1, the logo 14 is rotated to be displayed on the game initial display or others. If the logo is rotated simply on the x-axis and displayed, the logo 14 is displayed horizontally reverse in the mirror letters, but in this rotated display, the logo is rotated on the y-axis when the logo is located upright, whereby the logo can be always displayed properly in the horizontal direction with respect to the game players on both sides of the video game device 1 opposed to each other. Accordingly, the logo 14 can be easily recognized on both sides of the monitor screen 3 opposed to each other, which does not make the game players feel awkward.

Figure 6:
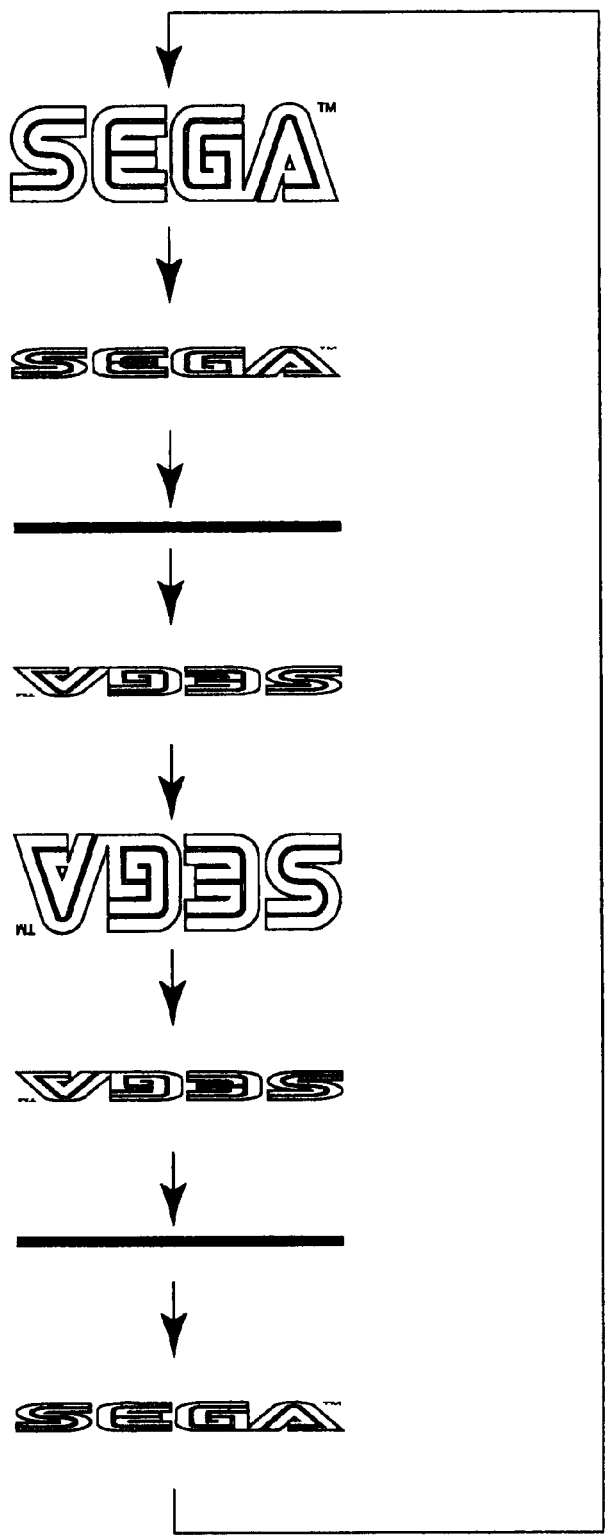
FIG. 6 shows alternative explanatory views of transient changes of a logo display on the initial display of FIG. 3.

The logo display pattern is not limited to the above-described rotated display. For example, it is possible that a reduced display and an expanded display are repeated, i.e., as shown in FIG. 6, the logo displayed, positioned properly with respect to one side is reduced to the line, and the line is again expanded to the logo displayed, positioned properly with respect to the other side.

Figure 7:
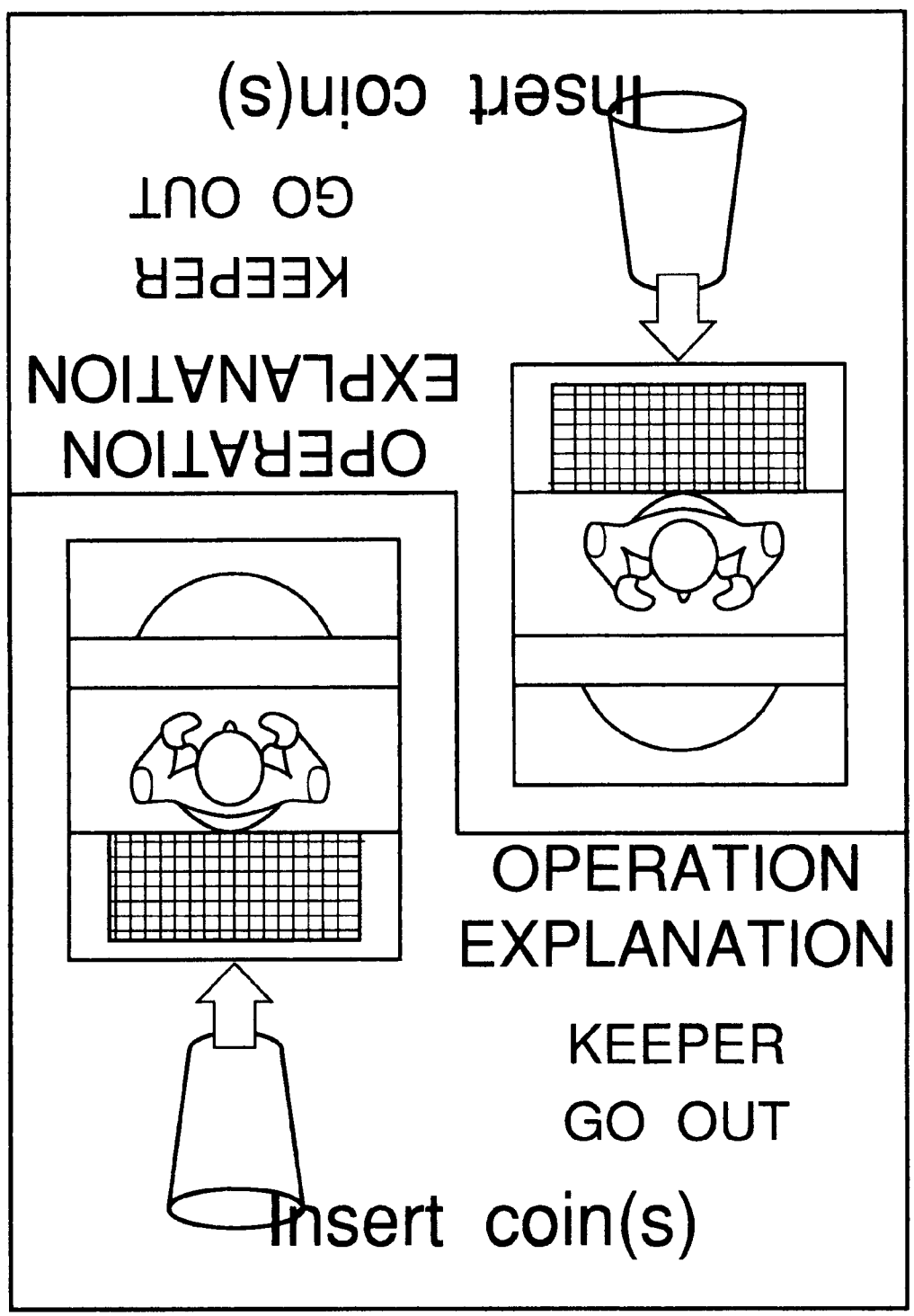
FIG. 7 is a view of one example of game operation explanatory displays of the soccer game device according to the embodiment of the present invention.

Also in the initial display shown in FIG. 3, the operation explanatory display shown in FIG. 7, etc., letters displayed in front of the respective game players are displayed properly with respect to the respective game players.

In a case that a display occupies a region of a certain area for each of the game players as shown in FIG. 7, it is preferable that the monitor screen is divided substantially at the center thereof in a manner, as exemplified in FIG. 7, which is required for the display, and the display is positioned properly with respect to the respective game players, so that the game players can easily understand a playing method.

Then, an operational method of the soccer game device 1 according to the present embodiment will be explained.

Figure 8:
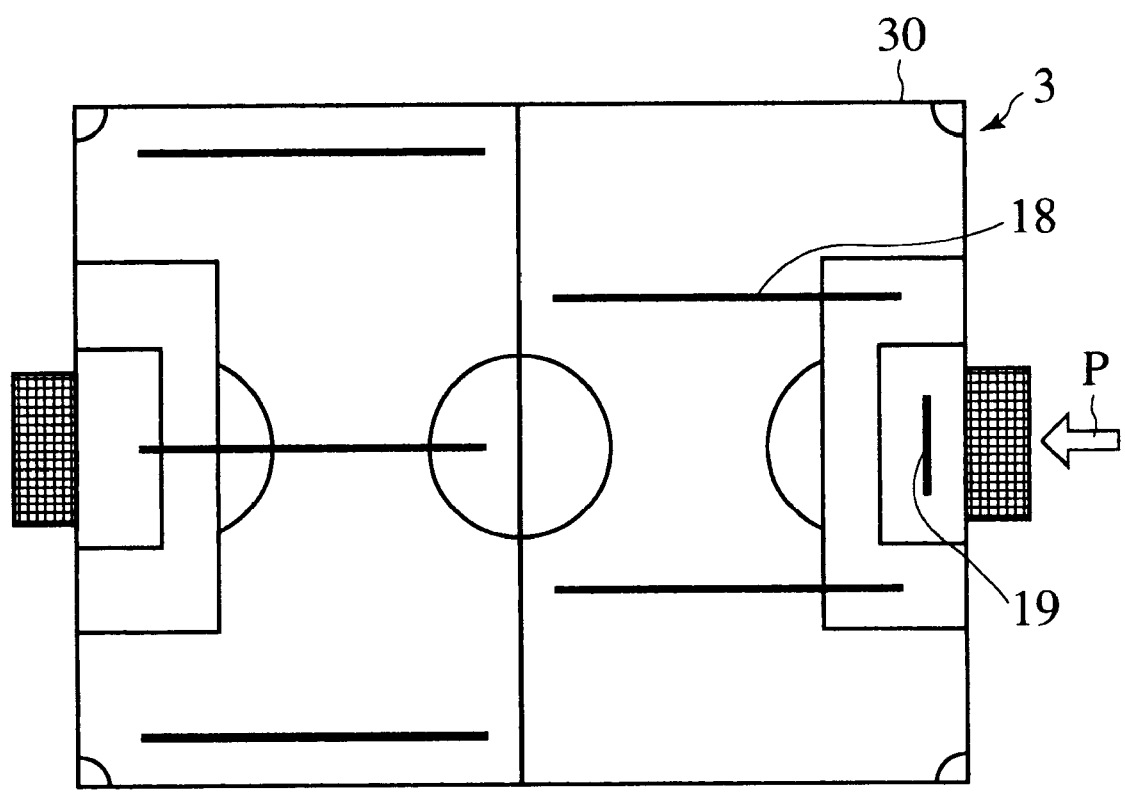
FIG. 8 is a view of regions of the soccer game device according to the embodiment of the present invention, where characters can be moved.

In the soccer game device 1 according to the present embodiment, one of the game players operates five field player characters by five sticks 5. As indicated by the solid lines 18 in FIG. 8, a range in which each character can be moved is three straight lines on the offense side and two straight lines on the defense side per one game player (indicated by the arrow P). A range 19 in which each goal keeper can be moved is the straight line 19, and the goal keeper can be operated by the central stick 5 only when the ball is in about ⅔ to ¾ of his own field.

Figure 9A:
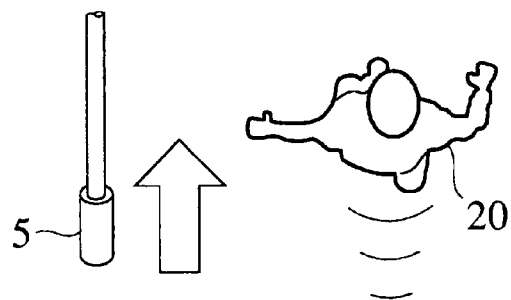
FIGS. 9(A–C) is views of motions of a character corresponding to motions of a stick of the soccer game device according to the embodiment of the present invention.
Figure 9B:
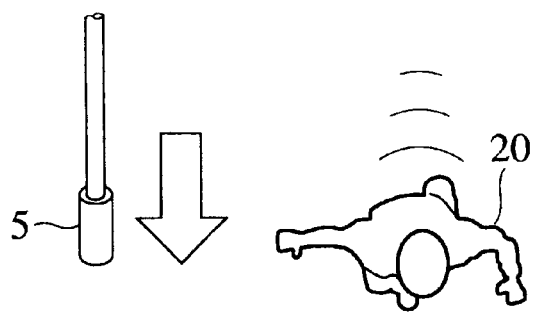
Figure 9C:
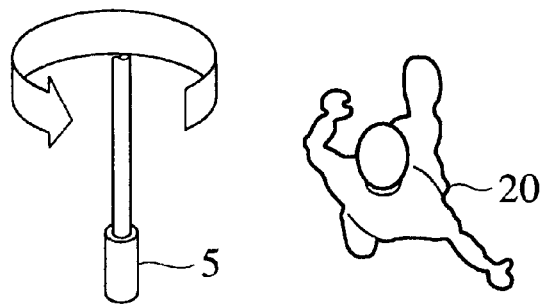

Relationships between operations of the sticks 5 by the game players and motions of the characters 20 will be explained. When a character 20 does not have the ball, as shown in FIGS. 9A and 9B he is moved by sliding a stick 5 forward and backward along a distance corresponding to a slide distance and is faced in the direction of the slide. When the stick 5 is rotated, as shown in FIG. 9C the character 20 is displayed with the leg put forward to kick the ball when the ball is near him.

Figure 10A:
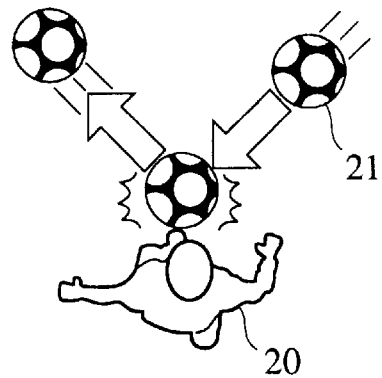
FIGS. 10(A–D) is views of rebounding direction of the ball corresponding to motions of a character of the soccer game device according to the embodiment of the present invention.

Ball operations by the character 20 will be explained. With the sticks 5 not operated, as shown in FIG. 10A when the character 20 collides with the ball 21, the ball rebounds at the same reflection angle as an incident angle as a racket of a block collapsing game. This enables the game player to anticipate to some extent a trace of the rebounded soccer ball. This enables inter-plays between characters 20 and makes the soccer game itself sophisticated.

Figure 10B:
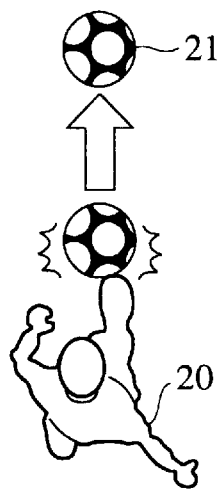
Figure 10C:
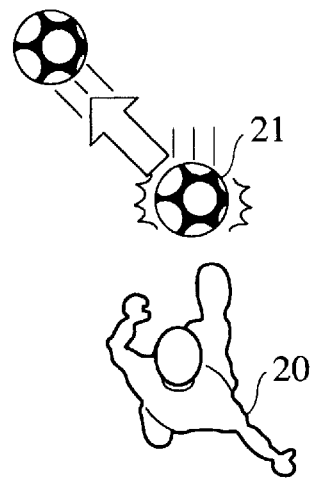

With the stick 5 rotated, as shown in FIG. 10B when the character 20 kicks near the ball 21, the ball 21 is kicked straight forward, and as shown in FIG. 10C the ball 21 is kicked in a direction of the rotation when the character 20 kicks remote from the ball 21.

Figure 10D:
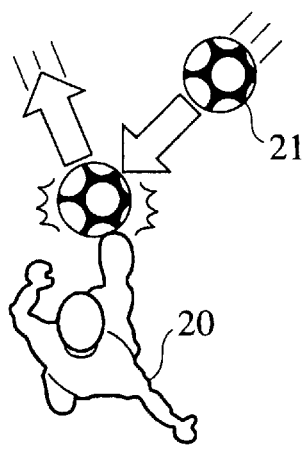

In an operation of kicking the ball approaching to the character 20 by pushing the stick 5, as shown in FIG. 10D the ball 21 is kicked in a direction of the push by correcting an angle (making a reflection angle larger than an incident angle). A moving speed of the ball 21 after kicked is preferably proportional to a moving speed of the stick 5. This allows a speed of a kicked ball 21 to be adjusted by adjusting a push of the stick 5, which permits the game players to more enjoy the operations.

FIGS. 11 and 12 model some examples of reflections and refractions of the ball with respect to the character 20. The arrows in the drawings indicate traces of the ball 21, and the rectangles represent the character 20.

Figure 11A:
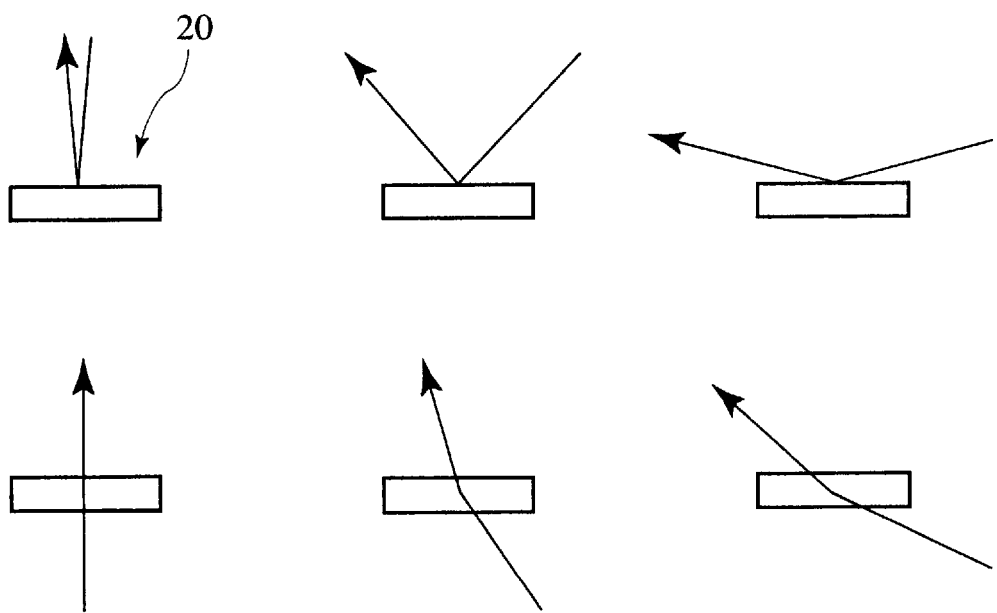
FIGS. 11(A–B) is views explaining relationships between a character and advancing directions of the ball.
Figure 11B:
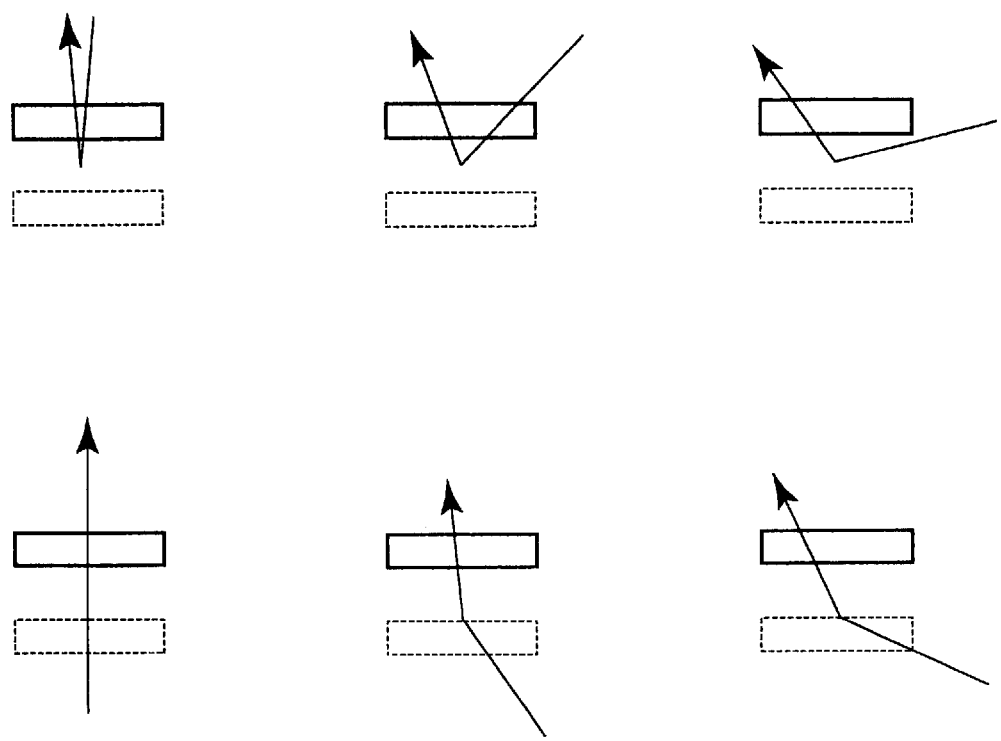
Figure 12A:
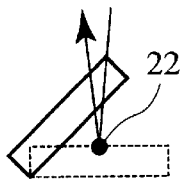
FIGS. 12(A–F) is views explaining relationships between a rotated character and advancing directions of the ball of the soccer game device according to the embodiment of the present invention.
Figure 12A:
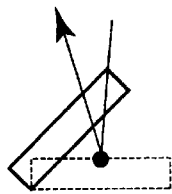
Figure 12A:
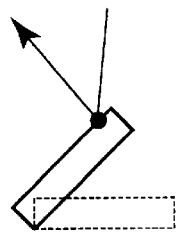
Figure 12B:
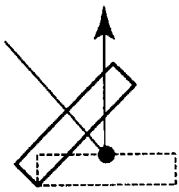
Figure 12B:
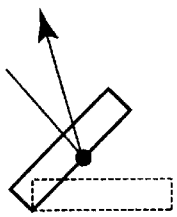
Figure 12B:
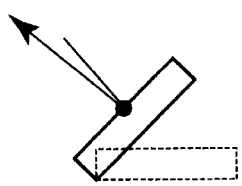
Figure 12C:
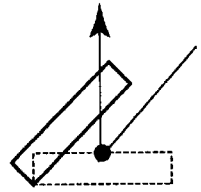
Figure 12C:
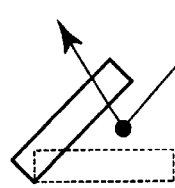
Figure 12C:
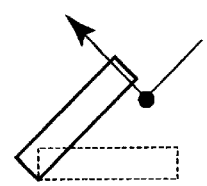
Figure 12D:
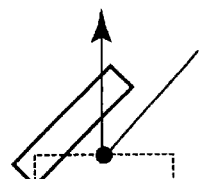
Figure 12D:
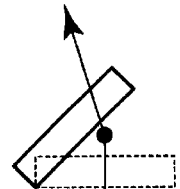
Figure 12D:
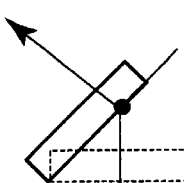
Figure 12E:
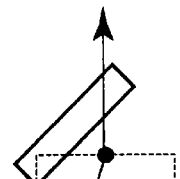
Figure 12E:
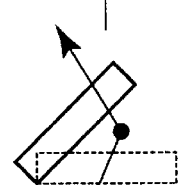
Figure 12E:
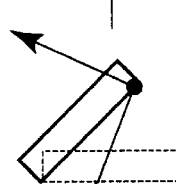
Figure 12F:
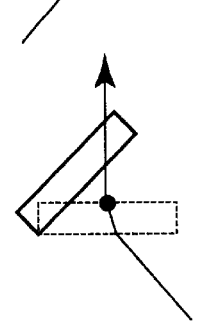
Figure 12F:
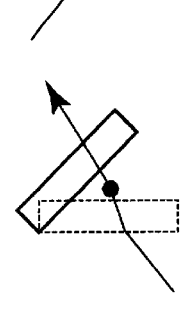
Figure 12F:
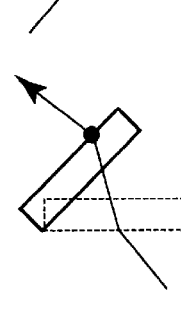

When the ball 21 collides with the a character 20 with the stick 5 stopped, the ball 21 is reflected and refracted in the directions as shown in FIG. 11A. When the ball 21 collides with the character 20 with the stick 5 pushed forward, the ball 21 is reflected and refracted in the corrected directions as shown in FIG. 11B.

When a direction of the character 20 is changed with the stick 5 rotated, reflection directions and refraction directions are further corrected. FIG. 12A to FIG. 12F show traces of the ball 21 corresponding to positions (the black points 22) where the ball 21 and the character 20 collide with each other when the stick 5 is rotated, and the character 20 is moved from the dot lines to the solid lines.

Motions of the ball 21 controlled by a field player character 20 have been explained above, but it is possible that the ball 21 have specific motions corresponding to rotation speed of a stick 5. For example, it is possible that when the stick 5 is rotated at a speed exceeding a prescribed speed upon the character 20 kicking the ball 21, the ball 21 is lifted proportionally with a rotation amount of the stick per a unit time for a display in which the ball 21 on the display becomes gradually larger, and a shade of the ball appears. It is possible that when the stick is rotated at a rotation speed exceeding a prescribed rotation speed with the character 20 being remote from the ball 21, the character 20 slides to the ball 21 to make the soccer game more effective.

Then, relationships between a character 20 who is the goal keeper and the central stick 5 will be explained.

Figure 13:
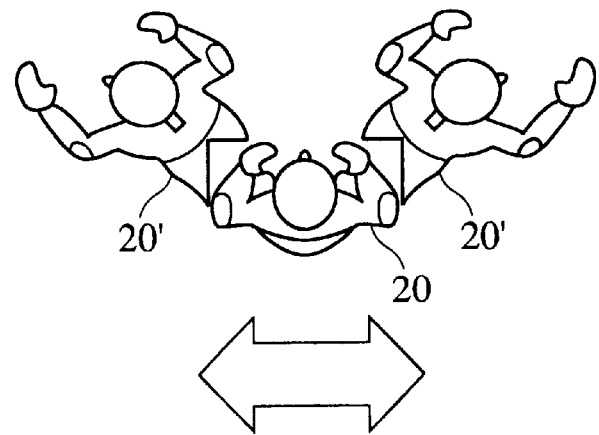
FIG. 13 is a view of a movable direction of the goal keepers and motions thereof of the soccer game device according to the embodiment of the present invention.

As shown in FIG. 13, when the central stick 5 is rotated at high speed, the character 20 takes a sliding action in the directions indicated by the arrows corresponding to moved rotation angles and directions, and when the central stick 5 is rotated at higher speed, the goal keeper is caused to jump and punch the ball as indicated by 20'. Although not shown, when the central stick 5 is pushed forward, the goal keeper is advanced by one body and then returned to the initial position.

For the sake of smoothly advancing the game, it is preferable that as long as the goal keeper thus touches the ball 21, the ball 21 is not caught by the goal keeper and is in the air, that rebounding directions of the punched ball are different depending on hitting positions, and that when the goal keeper advances and punches the ball, the ball 21 is punched farther away.

Figure 14:
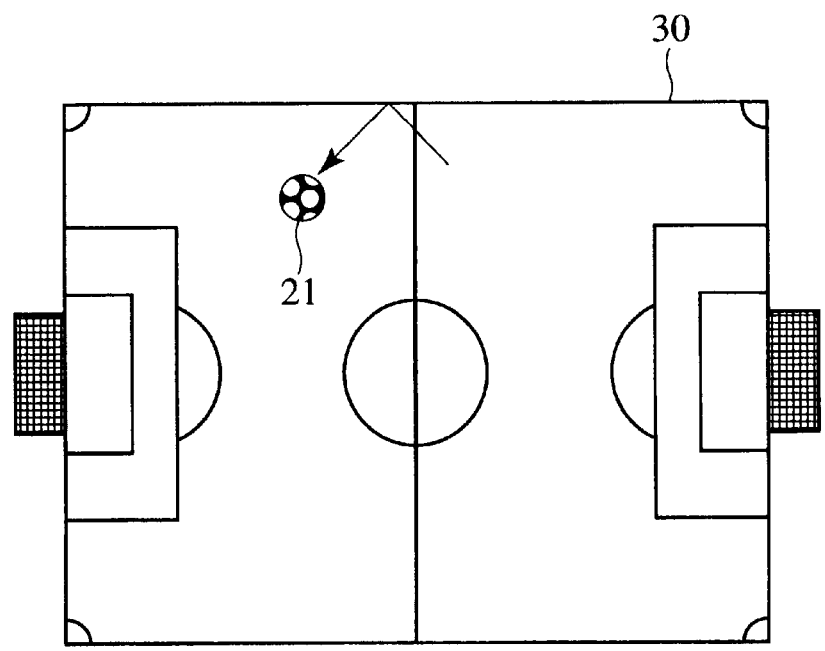
FIG. 14 is a view of a trace of the ball rebounded on a side line of the soccer field of the soccer game device according to the embodiment of the present invention.

Next, traces of the ball 21 on the monitor screen will be explained. As shown in FIG. 14, unless the ball 21 goes out of the field 30 or collides with a character 20, the ball 21 moves always straight, and rebounds of the ball 21 on the side lines and the end lines are so set that incident angles and the reflection angles are equal to each other. This enables the game players to anticipate so some extent traces of the rebounded ball 21 and enables inter-plays between characters 20 and makes the soccer game itself sophisticated.

Figure 15:
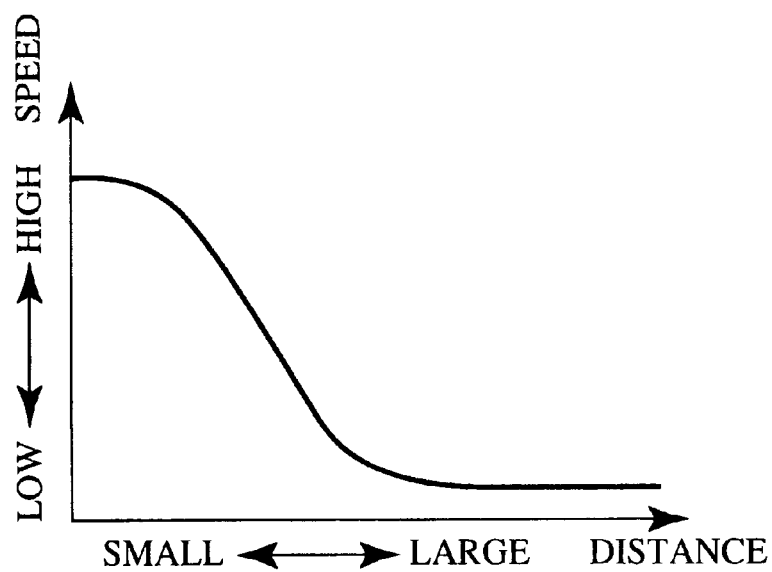
FIG. 15 is a graph of relationships between speeds of the kicked ball and distances of the soccer game device according to the embodiment of the present invention.

Then, the speed of the ball 21 will explained. As shown in FIG. 15, the speed of the ball 21 is decreased in accordance with a moving distance of the ball 21 but is not stopped. The ball 21 maintains a minimum speed which is above 0. This prohibits the ball 21 from stopping to avoid a state in which any of the characters cannot touch the ball 21, and makes the game speedy and accordingly entertaining.

Figure 16A:
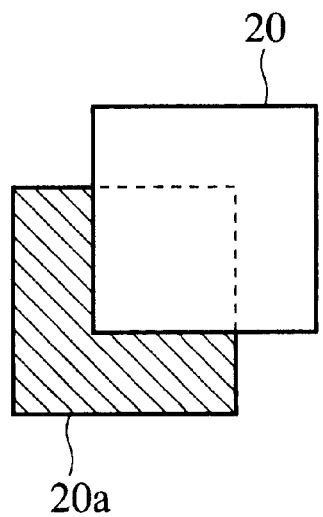
FIGS. 16(A–B) is views explaining principles of shading a character.
Figure 16B:
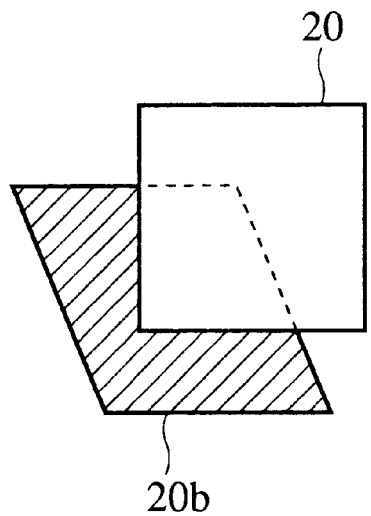
Figure 17:
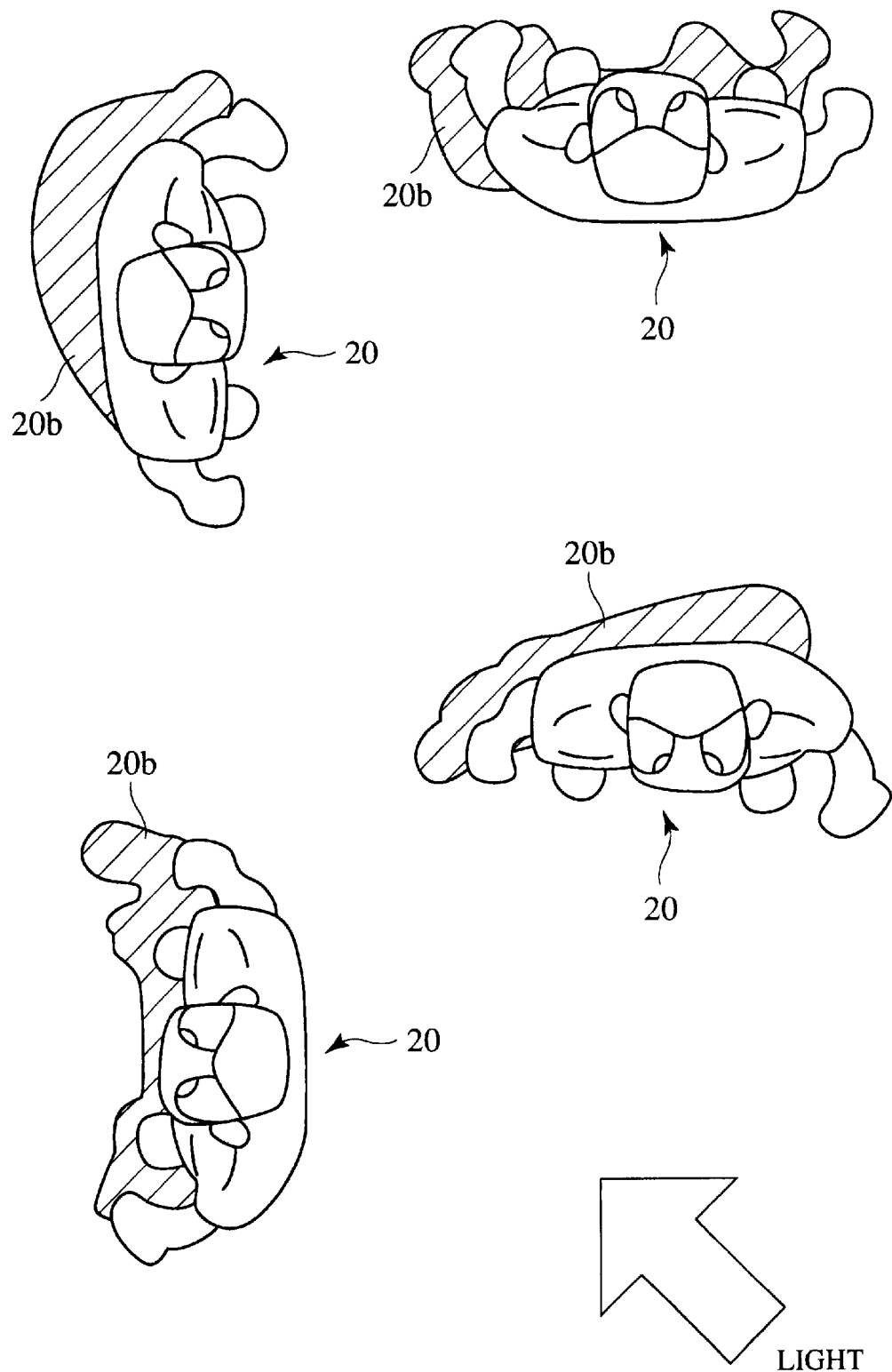
FIG. 17 is views of shades of a character shaded on the principle shown in FIG. 16.

Then, shading processing for enhancing reality of the game will be explained. It is known that in soccer games and baseball games in which characters move in fields, the characters are generally shaded to make them solid. As shown in FIG. 16A the shade 20a is usually provided, simply diagonally displaced with respect to a character 20. In the present embodiment, to make the shade more realistic, as shown in FIG. 16B, the shade 20b is diagonally moved parallelly with a character and further displaced slantly. FIG. 17 shows shades of a character 20 facing in various direction with light applied in the direction of the arrow. Thus the shading according to the present embodiment makes characters realistic than the simply diagonally displaced shading.

Figure 18:
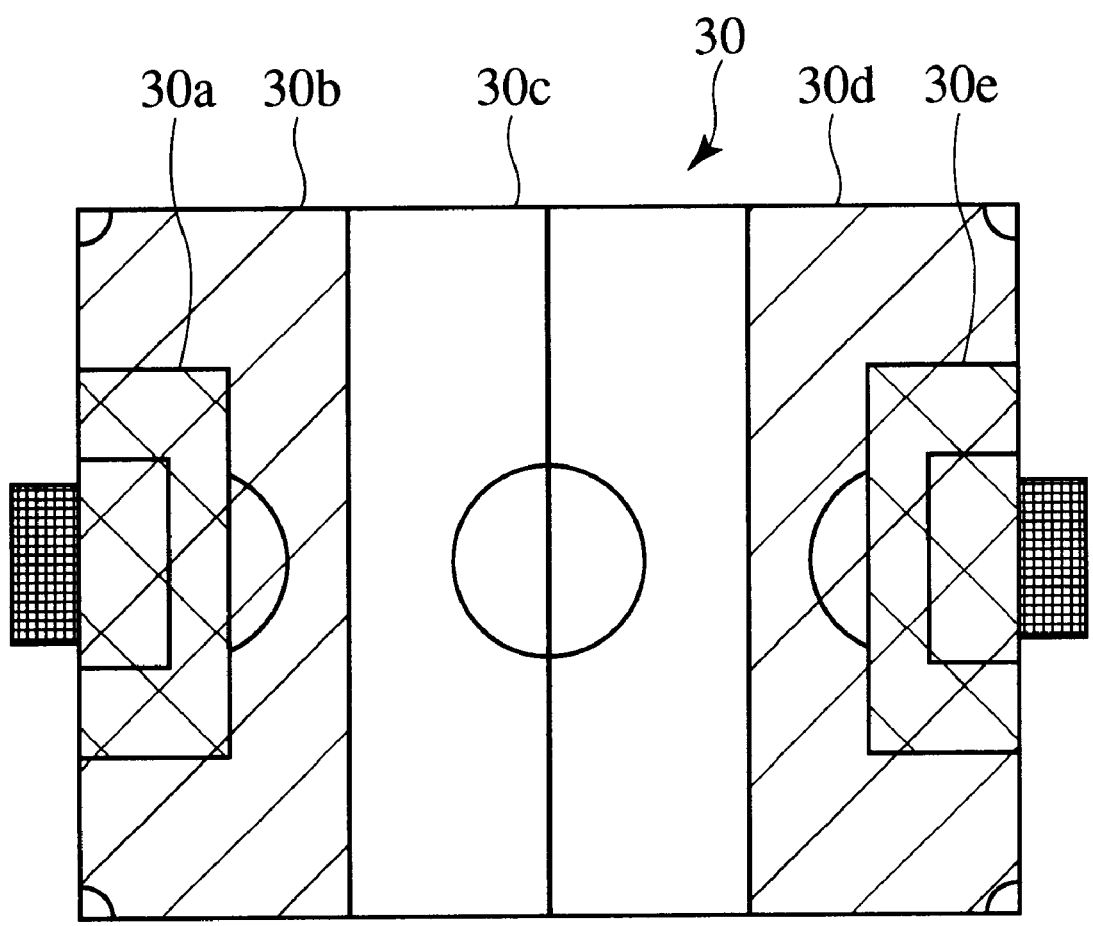
FIG. 18 is an explanatory view of volume control of cheering voices of the soccer game device according to the embodiment of the present invention.

Next, sound volume control for enhancing reality of the game will be explained. For enhancing reality during a play of the game by the game players cheering voices are outputted from speakers 180, 181, and in the present embodiment volumes of the cheering voices are controlled corresponding to positions of the ball in the field. As exemplified in FIG. 18, the soccer field 30 is divided in, e.g., five regions 30a, 30b, 30c, 30d, 30e. when the ball 21 is in the region 30c at the center of the field, the cheering voices are outputted in a small volume, The cheering voices are outputted in increasing volumes when the ball 21 is advanced into the regions 30b, 30d, which are nearer to the goal. The cheering voices are outputted in a maximum volume when the ball 21 is advanced into the regions 30a, 30e, which are penalty areas.

The present invention is not limited to the above-described embodiment and covers other various modifications.

In the above-described embodiment the present invention is applied to, e.g., a video game device for playing a soccer game but is applicable to any video game device for playing competing games, such as hockey games or other games, which are played by two game players opposed to each other across a monitor screen.

The rotated display of the logo, etc. is not essentially applicable to competing games and is applicable to other kinds of games.

Furthermore, the display method according to the present invention is applied to specific displays other than the display of the logo, etc., as of goals, scores, etc.

What is claimed is:

1. A control method of a video game device in which two game players are opposed across a monitor screen to compete, said video game device comprising:

a game device body including said monitor screen; and a plurality of operational sticks projecting from said game device body toward the respective players and being forwardly and backwardly slideable and/or rotatable clockwise and counter clockwise;

said method comprising:

moving said plurality of operational sticks to cause operating characters displayed on said monitor screen to hit a ball displayed on said monitor screen;

determining the moving speed of said plurality of operational sticks; and determining the moving speed of said hit ball based on said moving speed of said plurality of operational sticks.

2. The control method of a video game device according to claim 1, wherein when a rotation speed of the operational sticks is above a prescribed value, in a case that the ball is in a region where the ball can be hit, the hit ball floats above a field; and in a case that the ball is outside the region where the ball can be hit, the characters take a sliding action in a rotation direction.

3. The control method of a video game device according to claim 1, wherein when the ball hits the character from front, a reflection angle of the ball is equal to an indent angle of the ball on the characters.

4. The control method of a video game device according to claim 1, wherein when the ball hits the character from behind, the ball is refracted on the character to pass through the characters.

5. The control method of a video game device according to claim 3, wherein when the characters are moving forward and backward, a reflection angle or a refraction angle of the ball changes based on a forward or backward moving speeds of the characters.

6. The control method of a video game device according to claim 4, wherein when the characters are moving forward and backward, a reflection angle or a refraction angle of the ball changes based on a forward or backward moving speeds of the characters.

7. The control method of a video game device according to claim 1, the moving speed of the ball is gradually decreased corresponding to moving distances after hit.

8. The control method of a video game device according to claim 7, wherein a minimum speed of the ball does not become zero.

9. The control method of a video game device according to claim 1, wherein cheering voices being changed corresponding to positions of the ball so as to be louder as positions of the ball become nearer to a goal post.

10. A storage medium for storing a program for executing a method according to claim 1.

11. A storage medium for storing a program for executing a method according to claim 9.

* * * * *